United States Patent [19]
Demars

[11] Patent Number: 5,643,644
[45] Date of Patent: Jul. 1, 1997

[54] INSULATING GLAZING

[75] Inventor: Yves Demars, Agnetz, France

[73] Assignee: Saint Gobain Vitrage, Courbevoie, France

[21] Appl. No.: 312,761

[22] Filed: Sep. 27, 1994

[30] Foreign Application Priority Data

Sep. 27, 1993 [FR] France ................... 93 11470
Sep. 27, 1993 [FR] France ................... 93 11471

[51] Int. Cl.⁶ ........................................ E06B 3/66
[52] U.S. Cl. .................. 428/34; 428/38; 52/786.1; 52/786.13; 65/58
[58] Field of Search .................... 65/36, 43, 58, 65/42, 59.1, 34; 428/34, 38; 52/171.3, 172, 786.1, 786.13

[56] References Cited

U.S. PATENT DOCUMENTS

| | | | |
|---|---|---|---|
| 1,448,351 | 3/1923 | Kirlin | 65/58 X |
| 2,625,717 | 1/1953 | Wampler et al. | 65/58 X |
| 3,728,096 | 4/1973 | Hart et al. | 65/58 X |
| 3,862,830 | 1/1975 | Stern | 65/58 |
| 3,947,260 | 3/1976 | Salisbury | 65/58 X |
| 3,966,449 | 6/1976 | Foster et al. | 65/43 |
| 3,995,941 | 12/1976 | Nagahara et al. | 65/43 X |
| 4,260,406 | 4/1981 | Corbett et al. | 65/43 |
| 4,277,275 | 7/1981 | Kawamura et al. | 65/43 |
| 4,293,439 | 10/1981 | Corbett et al. | 252/316 |
| 5,489,321 | 2/1996 | Tracy et al. | 65/43 |

FOREIGN PATENT DOCUMENTS

WO91/02878  3/1991  WIPO .

OTHER PUBLICATIONS

Collins, R. E., "Evacuated Glazing", Proc. SPIE-Int. Soc. for Optical Engineering (Opt. Mater. Technol. Energy Effic. Sol. Energy Convers. XI), vol. 1727, pp. 358-367.

*Primary Examiner*—Milton Cano
*Attorney, Agent, or Firm*—Oblon, Spivak, McClelland, Maier & Neustadt, P.C.

[57] ABSTRACT

The invention relates to a process for producing a vacuum in an insulating glazing composed of two glass sheets (2, 3) separated by pins (4). According to the invention, one of the glass sheets includes a hole (12) which is plugged by a softened ball after the vacuum has been achieved. The invention also relates to an insulating glazing whose glass sheets are separated by pins (4) and joined at their periphery by a sealing joint.

12 Claims, 2 Drawing Sheets

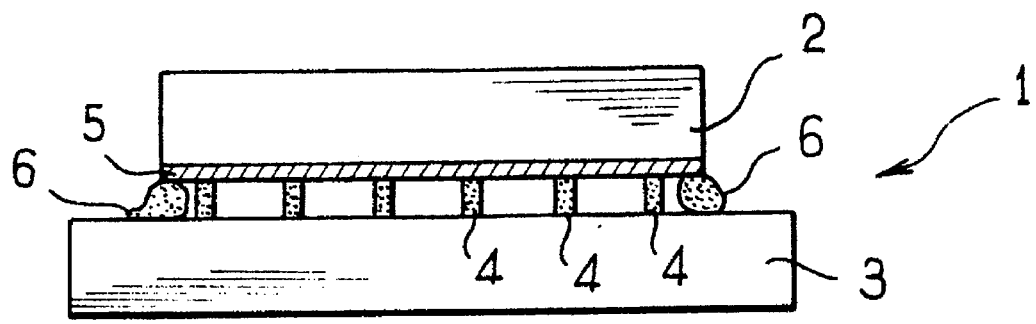
FIG_1
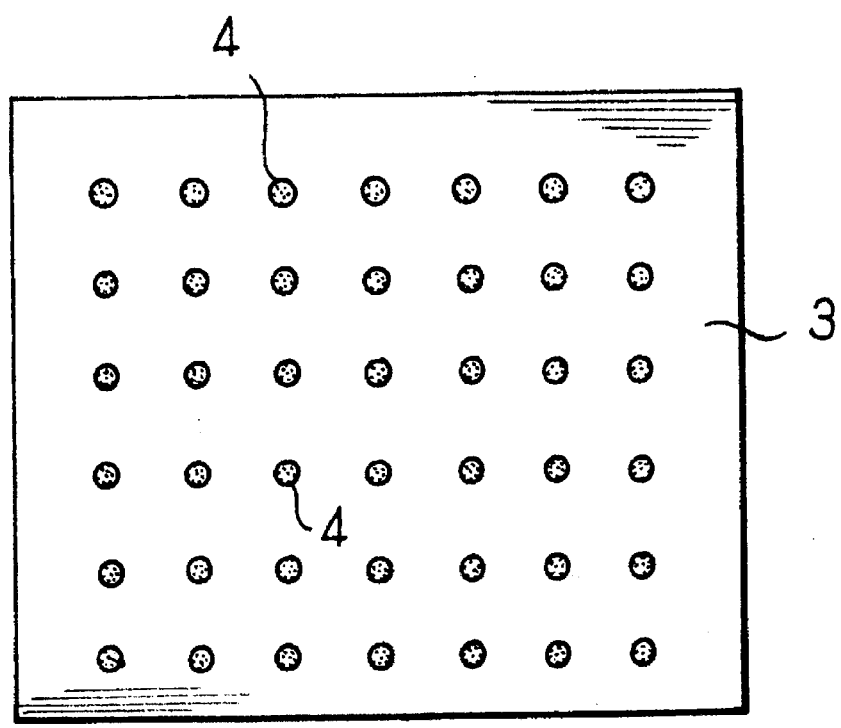
FIG_2

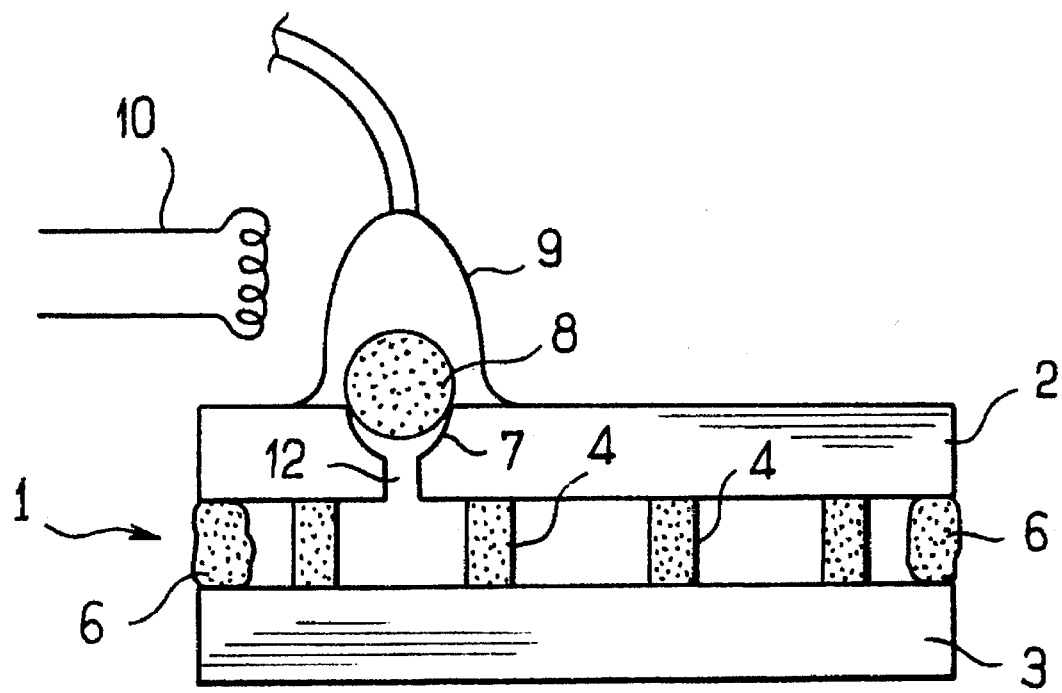
FIG_3
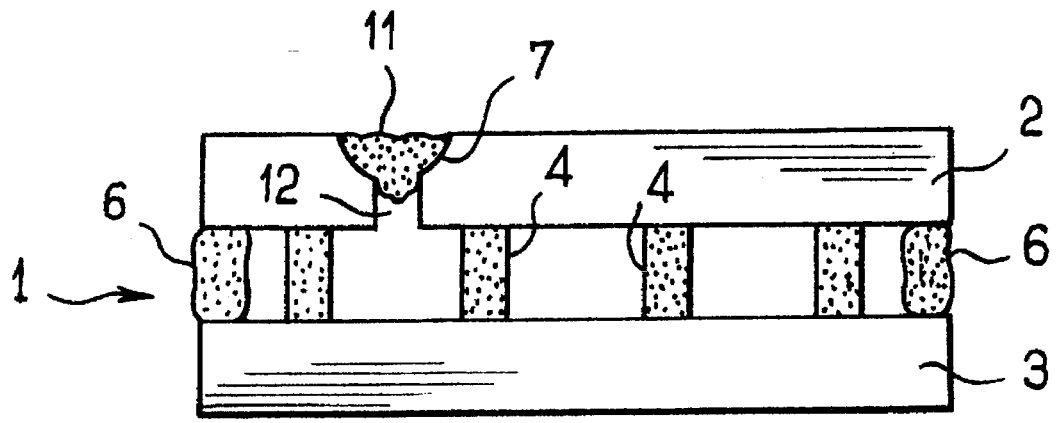
FIG_4

INSULATING GLAZING

BACKGROUND OF THE INVENTION

1. Field of the Invention

The invention relates to insulating glazings composed of at least two glass sheets separated from one another by a small space in which a vacuum has been produced.

2. Discussion of the Background

To obtain a thermal and/or acoustic insulation it is customary to form insulating glazings comprising two glass sheets separated from one another by a relatively large air space. Such glazings provide a thermal insulation that is judged insufficient for certain applications. To remedy this, it is known to make glazings that comprise three glass sheets, with one of the air spaces being able to be replaced with a gas, for example krypton. These glazings have thermal insulation properties that are clearly improved, but are of such a thickness that it is not always easy to use them.

Furthermore, users' current demands are directed toward a thermal insulation of glazings equivalent to that of solid partitions or walls.

Insulating glazings made of two glass sheets separated from one another by a space in which a vacuum has been produced have also been proposed, for example in patent WO 91/02878. As a result of the vacuum, these glazings have very good insulating properties, but they are very difficult to produce. On one hand, the small thickness between the two glass sheets, which is a few tens of millimeters, must be constant over the entire area where the glass sheets are facing. On the other hand, sealing of the two glass sheets must be made perfectly fluidtight.

Patent WO 91/02878 describes a technique which includes placing pins of several tens of millimeters thick on one of the glass sheets such that the pins are distributed over the entire surface, and also providing a joint which will permit the sealing of the two sheets. These pins and this joint are made of the same material of a glass composition. It appears that this glazing is difficult to produce because of these simultaneous required operations which are quite delicate. In addition, the sealing joint exhibits a number of bubbles which can be detrimental to fluidtightness or to attractiveness.

The above patent also describes a process for producing the vacuum between the two glass sheets. In particular, it proposes inserting a tube between the two glass sheets before sealing, to which a connection is made to pump out the air. Another embodiment consists in drilling a hole through one of the glass sheets and pumping the air through this opening. In the first case, it is necessary to seal the tube in a fluidtight manner at the same time as the glass sheets, which makes the operations difficult. Furthermore, after having produced the vacuum, it is necessary to seal the end of the tube, then protect this end to prevent it from breaking. In the second case, the vacuum is produced by a tube previously sealed around the hole. Then after having produced the vacuum, this tube is melted so as to seal its end. The drawback of these embodiments is the resultant insulating glazing exhibits a brittle point or break point (fragile region) either on the periphery, or on a surface thereof. In the second case there is, in addition, a part of the tube disposed outside of the glazing, which increases the danger of damage.

SUMMARY OF THE INVENTION

The invention has as an object, providing an insulating glazing composed of at least two glass sheets, between which a vacuum has been produced, which can be produced easily, and whose sealing joint exhibits no defect.

It is also an object of the present invention to provide a process for producing a vacuum within an insulating glazing to provide a glazing of this type that does not exhibit a brittle point or fragile area.

The invention provides an insulating glazing composed of at least two glass sheets between which a vacuum has been produced, with the glass sheets separated from one another by pins distributed over their entire surface and joined on their periphery by a sealing joint, the pins being made of at least a suspension of sintered solder glass which is devitrified during the production of the pins. The devitrification of the suspension of sintered solder glass is obtained by a heat treatment. The pins thus produced make it possible to maintain an even air space between the two glass sheets.

According to a variant of the invention, the pins are made of a mixture of a ceramic type material having a very high melting temperature, coated by the suspension of sintered solder glass. This embodiment further improves the strength of the pins and prevents any danger of deformation of a pin during its production. This material is selected from materials such as aluminum oxide, silicon carbide.

The pins separating the two glass sheets advantageously have a diameter less than 0.5 millimeter and a thickness between 0.1 and 0.3 millimeter. Their number is advantageously between 600 and 1500 per square meter and preferably equal to 1000 per square meter.

According to a preferred embodiment of the invention, the sealing joint is made with the suspension of sintered solder glass used in producing the pins. In a variant, the latter can also undergo a heat treatment leading to its devitrification.

The sealing joint thus produced makes it possible to obtain good fluidtightness which leads to good endurance of the glazings in which the vacuum has been produced. Furthermore, it appears that these joints exhibit a very small amount of bubbles (which could be detrimental to fluidtightness and to attractiveness). The results obtained are therefore completely satisfactory. On the other hand, the production of these glazings is simplified compared with conventional arrangements.

Actually, the devitrification of the suspension that constitutes at least part of the pins makes it possible to modify the viscosity profile as a function of the temperature of this material. The softening temperature of the devitrified suspension is higher than that of the suspension in the vitreous state. It is then possible to produce the sealing joint in a second step, such that the heat treatment does not present a danger of damaging the pins already made.

The two glass sheets advantageously undergo a tempering by cooling after one or the other of the heat treatments. This tempering makes it possible to reinforce the strength of the glass sheets when producing the vacuum.

In accordance with another aspect, at least one of the glass sheets advantageously comprises a low emissive layer on an inner face, i.e., in contact with the pins. This layer can contribute to the heat insulation function.

Thus, the problems mentioned in connection with the production of a vacuum in an insulating glazing which leaves a brittle point existing on such a glazing, are solved according to the invention by a process for producing a vacuum between two glass sheets forming an insulating glazing, which includes drilling a hole with a diameter of between 1 and 3 millimeters through one of the sheets, placing a ball at the external end of the hole, producing the vacuum, and then softening the ball to seal it on the glass sheet so as to plug the opening of the hole. The ball is advantageously made of a material having a softening temperature clearly lower than that of the glass sheet. In this way, it can be softened without the structure of the glass changing and being damaged. The material is selected such that the softening temperature is close to 400° C., i.e., between 380° and 450° C. The expansion coefficient of this material is advantageously selected near that of the glass sheet to prevent any danger of breakage by shearing.

In a preferred process, the surface of the glass sheet on which the ball must be sealed is raised to the softening temperature of the ball. The sealing thus obtained further strengthens the fluidtightness.

The closing of the hole, previously drilled through the glass sheet as discussed above, makes it possible to obtain a relatively homogeneous surface that exhibits an improved strength as compared with the sealing of a tube. Furthermore, according to the invention, there are no tube ends projecting beyond the surface as in previous methods.

In a variant of the invention, the end of the hole that is flush with the surface is countersunk so that the material, initially appearing in the form of a ball, comes to fill this hollow space. It is thus possible for the material to become continuous with the surface of the glass sheet.

The softening of the ball is obtained preferably by placing an electric resistor above the glazing near the ball.

The material constituting the ball can be that constituting the pins and the sealing joint. This results in a further advantageous use of the technique for producing the vacuum according to the invention with the glazing described, since the melting of the ball cannot cause any deterioration of the pins or of the sealing joint when they have undergone a devitrification treatment.

The material constituting the ball can also have a different nature and provide the same advantages so long as its softening temperature is less than that of the material constituting the pins and sealing joint, in its devitrified state.

However, it is to be understood that it is also possible to use the process described to produce the vacuum between two glass sheets, constituting an insulating glazing, separated by means other than those of the pins and the sealing joint as described herein. Also, it is to be understood that the vacuum produced in an insulating glazing having pins and a sealing joint as previously described can also be produced by processes different from that specifically described herein.

BRIEF DESCRIPTION OF THE DRAWINGS

Other details and advantageous characteristics will become apparent from the following description of illustrative embodiments with reference to the drawing figures in which:

FIG. 1, a side view in elevation of a portion of a glazing according to the invention;

FIG. 2, a top view in section of a portion of this same glazing;

FIG. 3, a side view in elevation of a glazing prepared for producing the vacuum;

FIG. 4, a side view in elevation of this same glazing after having sealed the opening.

DESCRIPTION OF THE PREFERRED EMBODIMENTS

Referring now to the drawings, it should be noted that the dimensions of the figures of course are not representative of reality, but are provided for ease of reference and description. In FIG. 1, a partial side view, in elevation, of a diagram of a glazing 1 according to the invention is represented. This glazing 1 is composed of two glass sheets 2 and 3 separated from one another by interlayer pins 4. The glass sheets each have a thickness of 4 millimeters. According to this exemplary embodiment, glass sheet 2 is coated on its inner face with a low emissive layer 5. This layer is, for example, of the type described in the French application filed in the name of Saint-Gobain Vitrage International under number 93 01 545.

Pins 4 have a thickness of 0.2 millimeter and a diameter of 0.4 millimeter. They are distributed over the entire surface of the glass sheets and are 30 millimeters apart from one another. This arrangement is shown more clearly in FIG. 2. The pins 4 are, on the one hand, made of a material with a very high melting temperature such as aluminum oxide which appears in the form of crystals, the latter being coated on the one hand by a suspension of sintered solder glass. This suspension is, for example, as described in U.S. Pat. Nos. 4,260,406 and 4,293,439. This suspension of sintered solder glass is selected so that its softening temperature is clearly lower than that of the glass, so as not to damage the glass sheets during the heat treatment(s). The suspension is also selected with an expansion coefficient equivalent to that of the glass sheets so that there is no danger of shearing between the pins and the glass sheets.

These pins 4 are deposited on the glass sheets 2, 3, for example, by a technique of the silk screening type, or with the aid of a device of the microsyringe type, or with the aid of any device known to those skilled in the art.

These pins 4 then undergo a heat treatment so as to eliminate organic substances and to bond the suspension to the glass sheets. At the same time, the crystals of material that cannot melt at the temperatures reached make it possible to preserve the shape and the dimensions of the pins which do not spread out.

The heat treatment according to the invention is such that it leads to a devitrification of the suspension. This makes it possible to change the viscosity profile of the suspension as a function of temperature, i.e., for a given temperature the viscosity of the suspension is greater in the devitrified state than in the one corresponding to the vitreous state.

The second glass sheet is then placed on these pins opposite the preceding one.

Glass sheet 3 has a size slightly greater than glass sheet 2. This oversizing makes possible an easier mounting later. Another advantage of this oversizing is to make possible the depositing of the sealing composition on the periphery of this glass sheet 3, which will migrate by capillary action between the two glass sheets to form a sealing joint 6. The sealing composition is identical to the one used for the coating of the pins. Likewise, a heat treatment is performed which can be identical to the preceding one, i.e., the one relating to pins 4, and leads to a devitrification of the suspension. Since the viscosity profile of the composition is changed after devitrification, it is possible to perform the second heat treatment without danger of damaging pins 4.

After this second heat treatment, the glazing thus constituted is cooled so as to achieve a tempering of the two glass sheets 2, 3. This tempering makes it possible to impart mechanical properties to the glass sheets 2, 3 which can thus better withstand the subsequent operations including forming the vacuum. The value of this vacuum is approximately $10^{-4}$ Torr.

The glazing thus described according to the invention provides a good thermal insulation. It is comparable to that provided by glazings comprising three glass sheets, an air space and a space filled with a gas of the Krypton type. Such a glazing has a thickness of about 30 millimeters. Thus, one advantage of the glazing according to the invention is to reduce the thickness to less than 10 millimeters for an equivalent thermal insulation, and therefore provide a simplified or more convenient glazing to use.

On the other hand, the esthetic appearance of this glazing is satisfactory. First of all, the size of the pins distributed homogeneously over the entire surface make them very unobtrusive. In addition, these pins which keep their dimensions during the production of the glazing, make it possible to prevent any contact between the two glass sheets. Therefore, no Newton's rings appear—which have an unsightly effect when they appear on such a glazing.

In FIG. 3, an insulating glazing 1 is represented that is composed of two glass sheets 2 and 3 separated from one another by a group of pins 4 distributed over the entire surface of the glazing. These pins have a diameter less than 0.5 millimeter so as to be not very visible. In addition, pins 4 have a thickness less than 0.3 millimeter to maintain a very slight space between the glass sheets. On the periphery of the glazing, a sealing joint 6 assures fluidtightness of the space between the two glass sheets.

Glass sheet 2 includes a drilled hole or passage 12 which constitutes a passage for air. The upper end 7 of this passage is countersunk. This countersunk end 7 receives a ball 8 which is held in this conical shape. The ball 8 is made of a suspension of sintered solder glass such as the one described in U.S. Pat. Nos. 4,260,406 and 4,293,439. This suspension of sintered solder glass is selected so that its softening temperature is clearly lower than that of the glass, so as not to damage the glass sheet during the heat treatment to which it will eventually be subjected. The suspension is also selected with an expansion coefficient equivalent to that of the glass sheet.

A device 9 envelops the end 7 on which the ball 8 is placed. This device 9 (which can be a tube, a bell or any other device known to a person skilled in the art) has an end which connects or comes in contact with the glazing of the system, making it possible to produce the vacuum. This evacuating system is not shown in the figures. It can be any known system making it possible to attain a pressure less than $10^{-3}$ Torr.

An electric resistor, diagrammed by filament 10 (FIG. 3), is placed near this device 9. The resistor makes it possible, after having produced the vacuum, to bring ball 8 to its softening temperature. The volume of the ball is defined so that it fills the countersunk end 7 of the hole.

FIG. 4 represents the same glazing after this operation. Ball 8 has then taken the shape of plug 11 which is sealed to the end of the hole. It then assures a good fluidtightness. Once this plug is cooled, device 9 is withdrawn.

The heat treatment applied to transform the ball and seal end 7 must not damage the unit of the glazing nor device 9, generally of glass. For this reason, the material constituting ball 8 is selected such that its softening temperature is clearly less than that of the glass. Furthermore, so as not to damage pins 4 and sealing joint 6, they can be made with the same material as that constituting ball 8. To ensure that pins 4 and joint 6 do not disadvantageously soften, they have previously undergone a heat treatment, particularly during their formation, which results in the material being present in a devitrified state. In this way the softening temperature of these elements has been raised and when ball 8 is brought to its softening point, pins 4 and joint 6 remain in their state and maintain their shapes and their dimensions.

The process thus described makes it possible to obtain an insulating glazing under vacuum which exhibits no brittleness point or weakened area. Actually, plug 11 has a relatively large thickness which imparts to it a good strength, in contrast with the sealing of a simple tube which remains fragile. Furthermore, the glazing obtained exhibits almost no raised feature on its surface since plug 11 is inserted in countersunk opening 7.

What is claimed as new and desired to be secured by Letters Patent of the United States is:

1. An insulating glazing comprising:

two glass sheets, having a vacuum formed between the glass sheets;

pins which separate said two glass sheets from one another and which are distributed over an entire surface of said sheets, said pins being made of aluminum oxide coated with a suspension of sintered solder glass which is devitrified during the production of said pins; and a sealing joint joining said two glass sheets together at their periphery.

2. An insulating glazing obtained according to claim 1, wherein said glazing exhibits on one of its interior faces an area made of a material having a softening point less than that of the glass sheets.

3. An insulating glazing according to claim 2, wherein one of the glass sheets has a surface area greater than the other glass sheet.

4. An insulating glazing according to claim 1, wherein a number of the pins per square meter is between 600 and 1500.

5. An insulating glazing of claim 4, wherein the number of pins per square meter is 1000.

6. An insulating glazing according to claim 1, wherein the sealing joint is made of the suspension of sintered solder glass.

7. An insulating glazing according to claim 6, wherein the suspension of sintered solder glass constituting the sealing joint is devitrified.

8. An insulating glazing according to claim 1, wherein the glass sheets have a thickness of 4 millimeters.

9. An insulating glazing according to claim 1, wherein at least one of the glass sheets is tempered.

10. An insulating glazing according to claim 1, wherein at least one of the glass sheets has a low emissive layer on its face in contact with the pins.

11. An insulating glazing comprising:

two glass sheets, having a vacuum formed between the glass sheets;

pins which separate said two glass sheets from one another and which are distributed over an entire surface of said sheets, said pins being made of silicon carbide coated with a suspension of sintered solder glass which is devitrified during the production of said pins; and a sealing joint joining said two glass sheets together at their periphery.

12. An insulating glazing according to claim 1 or 11, wherein the pins have a diameter less than 0.5 millimeter and a thickness between 0.1 and 0.3 millimeter.

* * * * *